(12) United States Patent
Marzona

(10) Patent No.: US 7,802,601 B2
(45) Date of Patent: Sep. 28, 2010

(54) JOINING PRESS FOR JOINING THE ENDS PARTICULARLY OF A CONVEYOR BELT AND THE LIKE

(75) Inventor: Alberto Marzona, Venezia Mestre (IT)

(73) Assignee: Habasit Italiana S.p.A., Cesano Boscone (IT)

( * ) Notice: Subject to any disclaimer, the term of this patent is extended or adjusted under 35 U.S.C. 154(b) by 167 days.

(21) Appl. No.: 11/987,437

(22) Filed: Nov. 30, 2007

(65) Prior Publication Data

US 2008/0135185 A1    Jun. 12, 2008

(30) Foreign Application Priority Data

Dec. 12, 2006  (IT)  ............... MI2006A2377

(51) Int. Cl.
*B32B 37/00*    (2006.01)

(52) U.S. Cl. .............. 156/498; 156/502; 156/580; 156/583.1

(58) Field of Classification Search ............. 156/498, 156/502, 580, 581, 583.1, 583.4
See application file for complete search history.

(56) References Cited

U.S. PATENT DOCUMENTS 5,562,796 A * 10/1996 Ertel ................ 156/498

* cited by examiner

*Primary Examiner*—James Sells
(74) *Attorney, Agent, or Firm*—Modiano & Associati; Albert Josif; Daniel J. O'Byrne

(57) ABSTRACT

A joining press for joining the ends particularly of a conveyor belt, comprising lower and upper heating plates which can be engaged by pusher pads in order to apply the necessary pressure, the plates being supported by reaction beams to contain a load applied by the pusher pads, the reaction beams having seats for detachably accommodating reinforcement elements.

10 Claims, 6 Drawing Sheets

JOINING PRESS FOR JOINING THE ENDS PARTICULARLY OF A CONVEYOR BELT AND THE LIKE

BACKGROUND OF THE INVENTION

As is known, joining presses for joining the ends of conveyor belts and the like are already commercially available which generally speaking have a pair of heating plates functionally connected to two pneumatic pads, which provide the necessary pressure to the plates which are pressed onto the belt and are connected, together with the heating plates, to two structural beams which provide contrast to the load applied by the pads.

As is evident, flexing of the beam when loaded must be as limited as possible to avoid modifying the geometry of the system, and the beam must further have a limited height in order to be able to work with belts which have a limited extension.

Another problem relates to the weight of the beam in order to allow its easy maneuverability.

Another aspect further consists in that the presses are provided in different sizes as a function of the widths of the belts, and therefore with the solutions of the background art it is necessary to provide reaction beams which in each instance must be designed and manufactured as a function of the load to which they must be subjected.

Consequently, production is very expensive, because it is not possible to unify the production of the beam, regardless of the width of the belt to which it will be applied.

Another problem is also linked to the difficulties in manufacturing such beam and to the complexity encountered for correct mating of the heating plate.

SUMMARY OF THE INVENTION

The aim of the invention is to solve the problems described above by providing a joining press for joining the ends particularly of a conveyor belt and the like which allows to vary the rigidity of the beam as a function of the context of application, without therefore having to resort to a specific design as a function of its dimensions.

Within this aim, an object of the invention is to provide a beam with variable rigidity in which it is possible to contain the weight considerably, contributing to easy maneuverability of such beam.

Another object of the present invention is to provide a press in which it is possible to have rapid assembly of the heating plate without having to resort to the use of screws.

A further object of the present invention is to provide a joining press which, thanks to its particular constructive characteristics, is capable of giving the greatest assurances of reliability and safety in use.

Another object of the present invention is to provide a joining press which can be obtained easily starting from commonly commercially available elements and materials and is also competitive from a merely economical standpoint.

This aim and these and other objects, which will become better apparent hereinafter, are achieved by a joining press for joining the ends particularly of a conveyor belt and the like according to the invention, comprising lower and upper heating plates which can be engaged by pusher pads in order to apply the necessary pressure, said plates being supported by reaction beams to contain a load applied by said pusher pads, characterized in that said reaction beams have seats for detachably accommodating reinforcement elements.

BRIEF DESCRIPTION OF THE DRAWINGS

Further characteristics and advantages will become better apparent from the description of a preferred but not exclusive embodiment of a joining press for joining the ends particularly of a conveyor belt and the like, illustrated by way of non-limiting example in the accompanying drawings, wherein.

DESCRIPTION OF THE PREFERRED EMBODIMENTS

Figure 1:
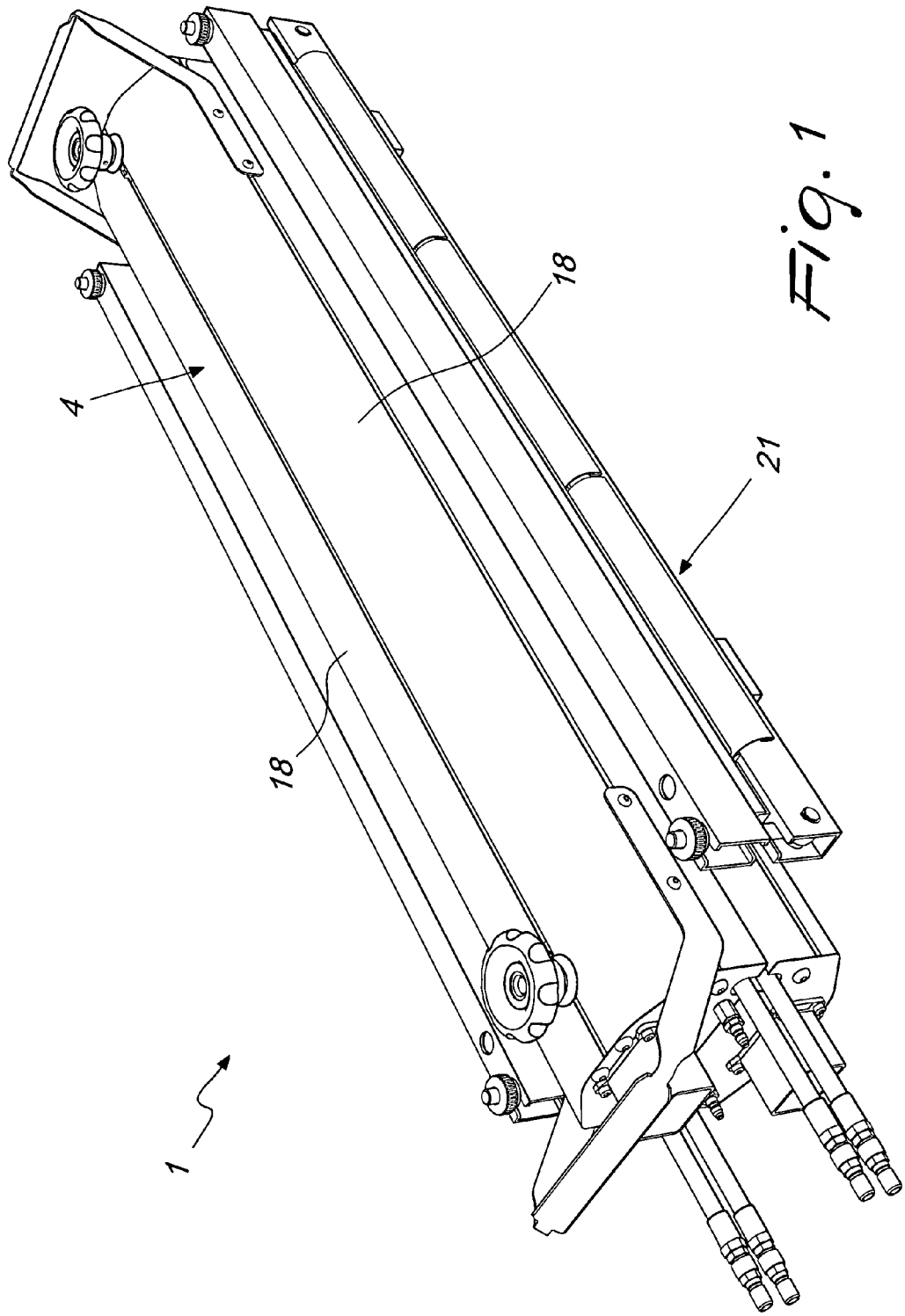
FIG. 1 is a schematic perspective view of the press in the closed position.
Figure 2:
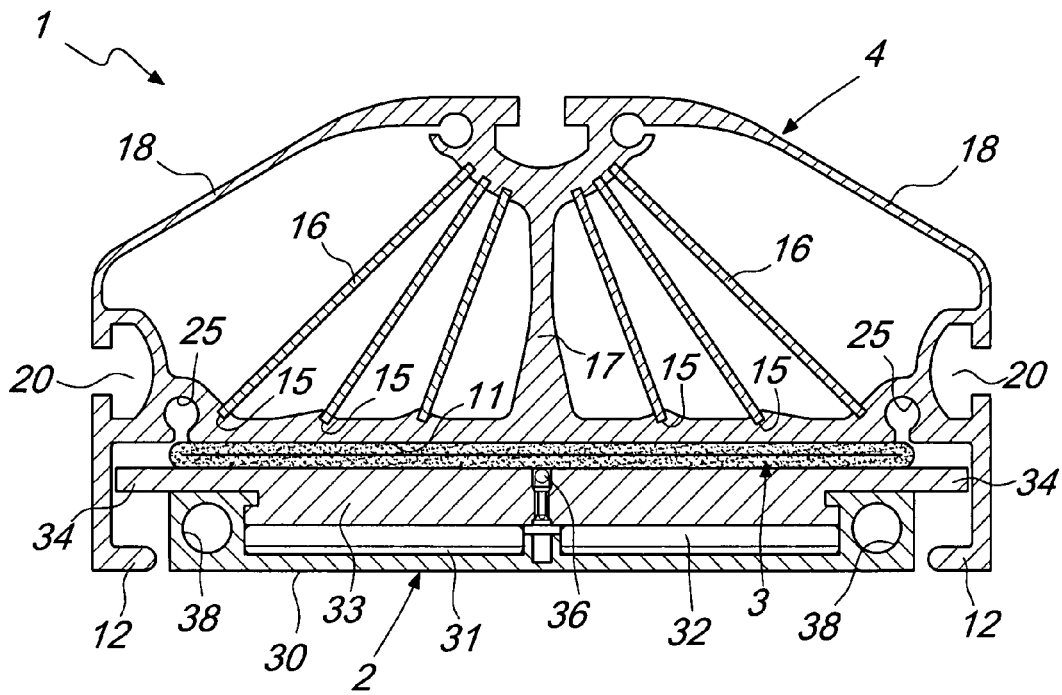
FIG. 2 is a transverse sectional view of the reaction beam and of the heating plate.
Figure 3:
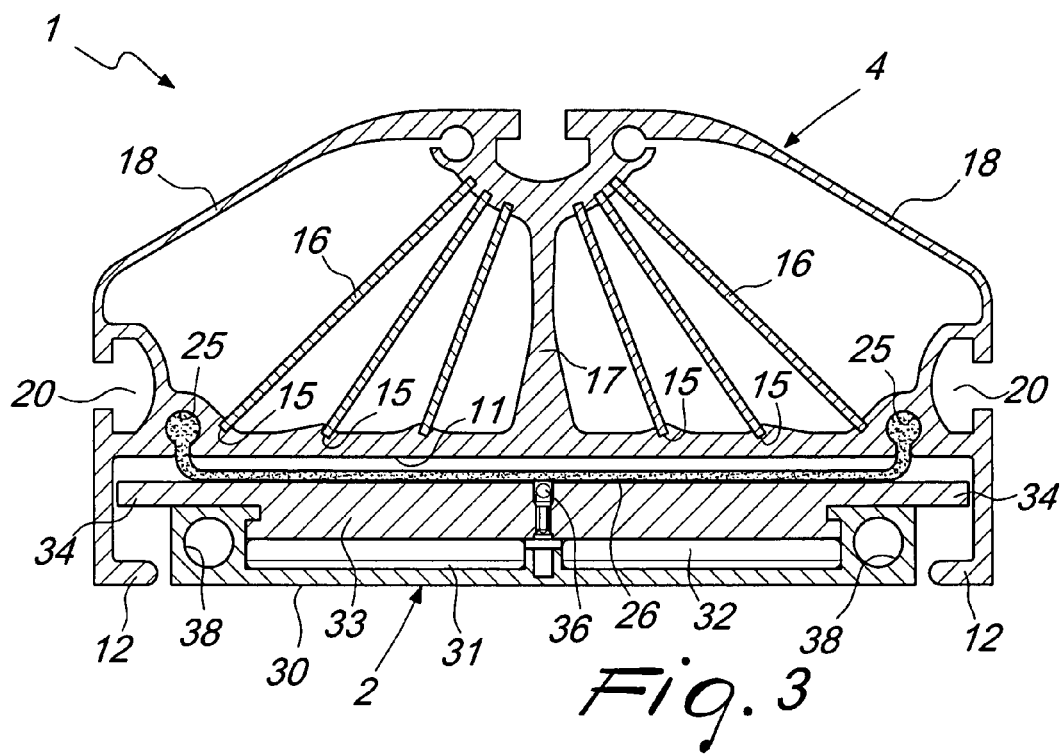
FIG. 3 is a sectional view of a constructive variation of the pusher pad.
Figure 4:
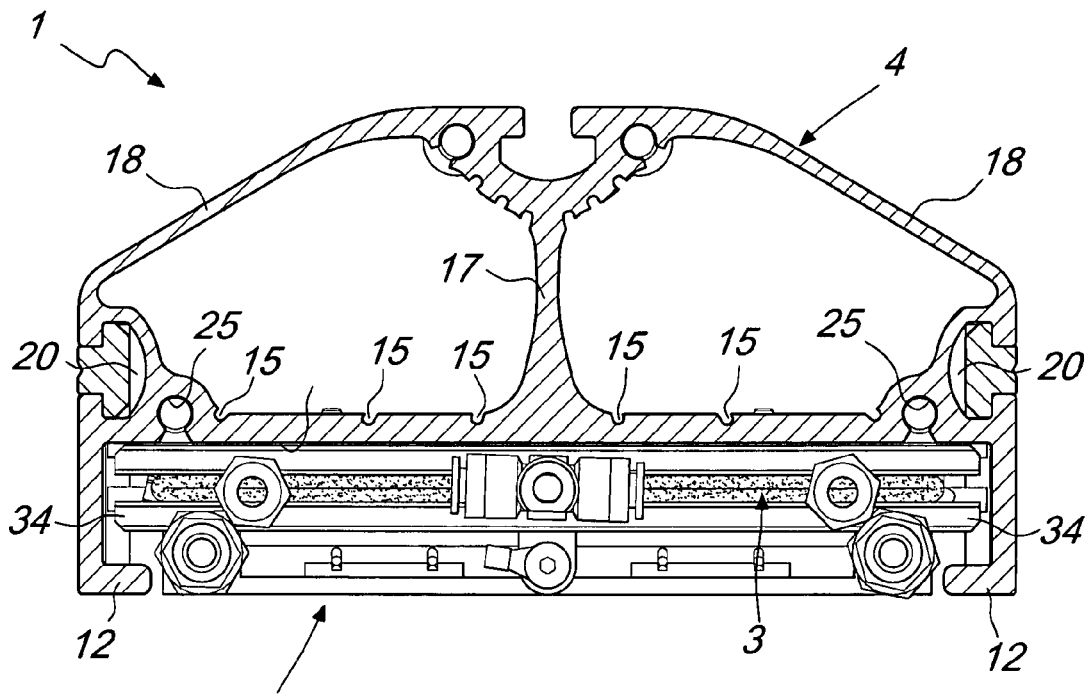
FIGS. 4, 5, 6 and 7 are sectional views of different types of reinforcement of the reaction beam.
Figure 5:
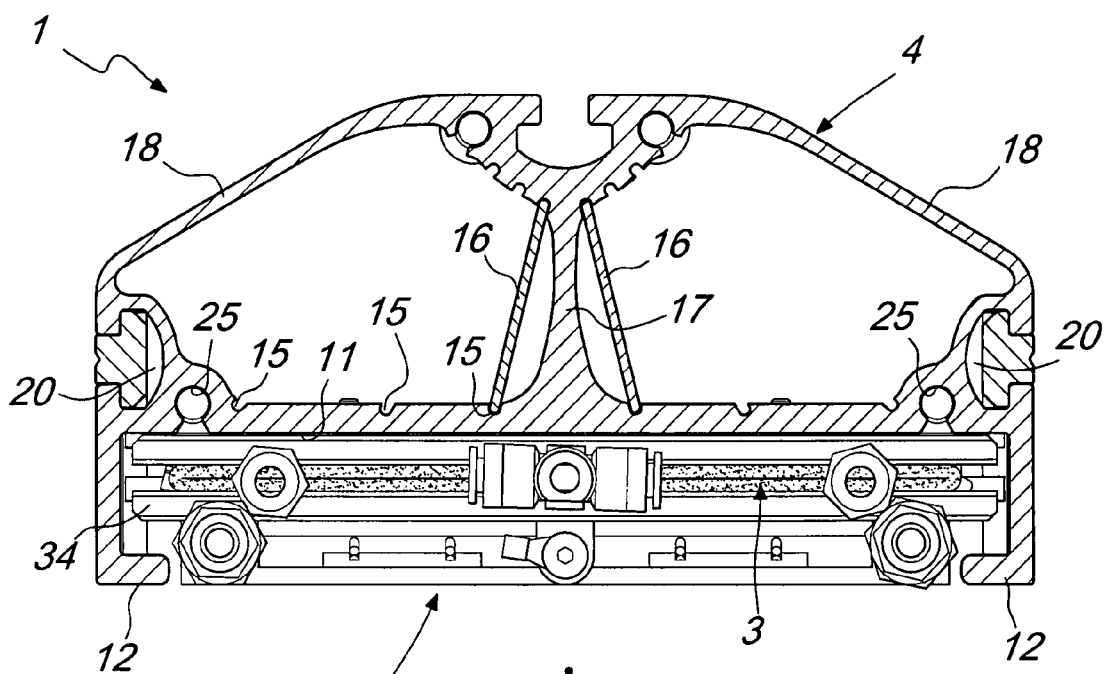
Figure 6:
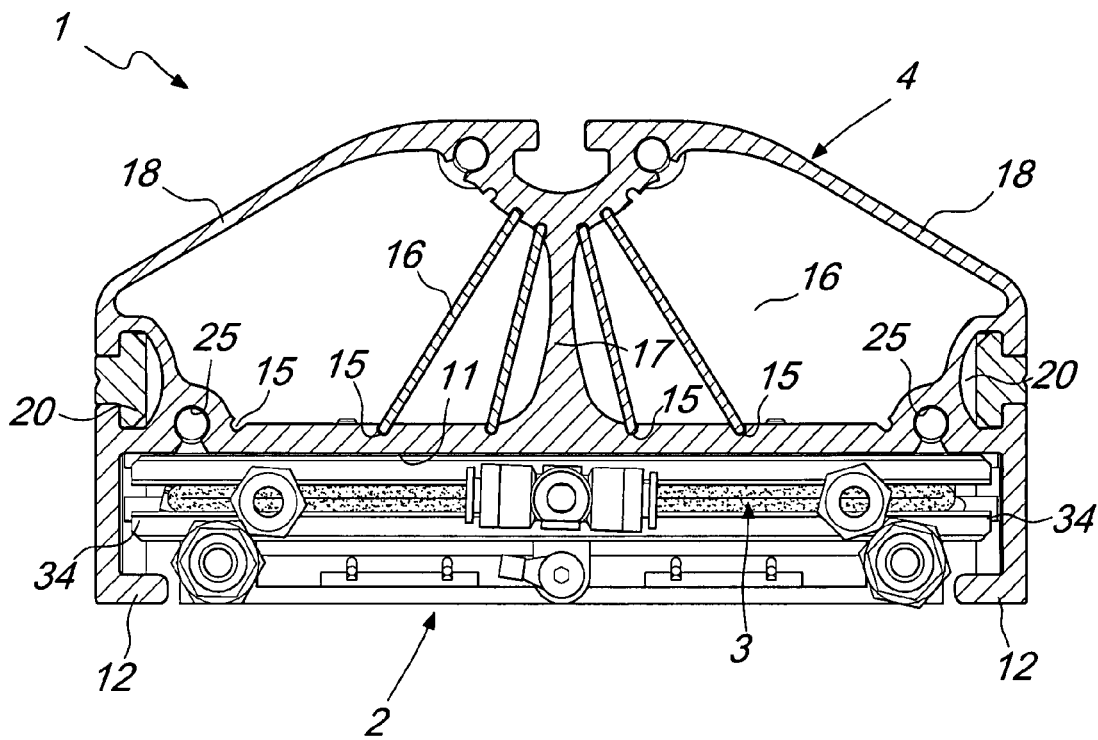
Figure 7:
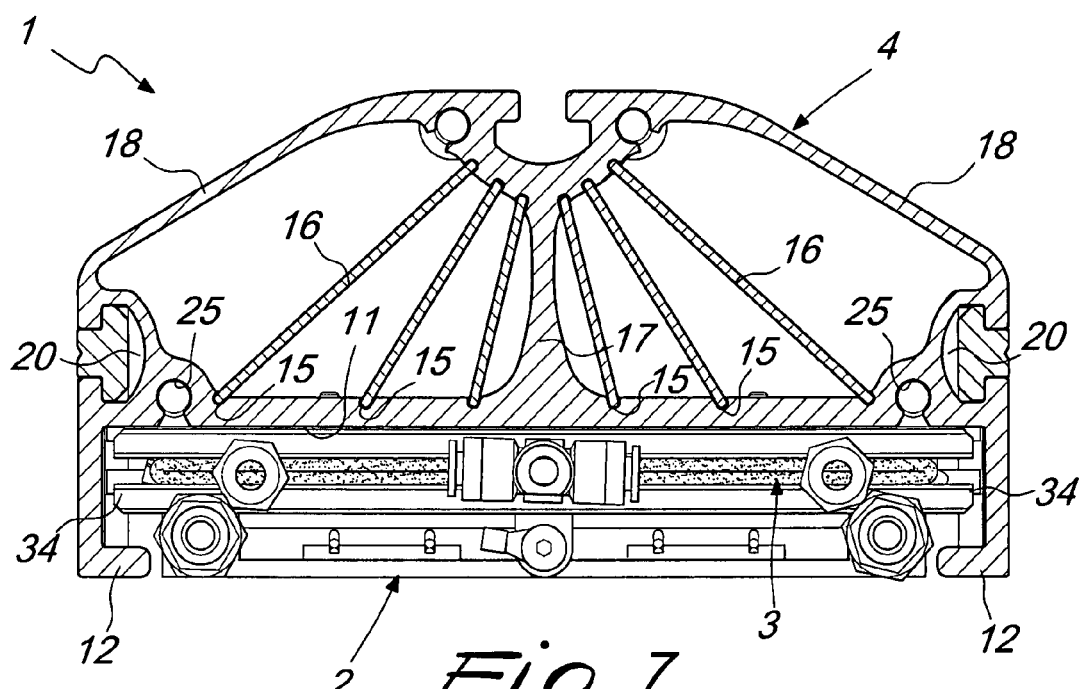
Figure 8:
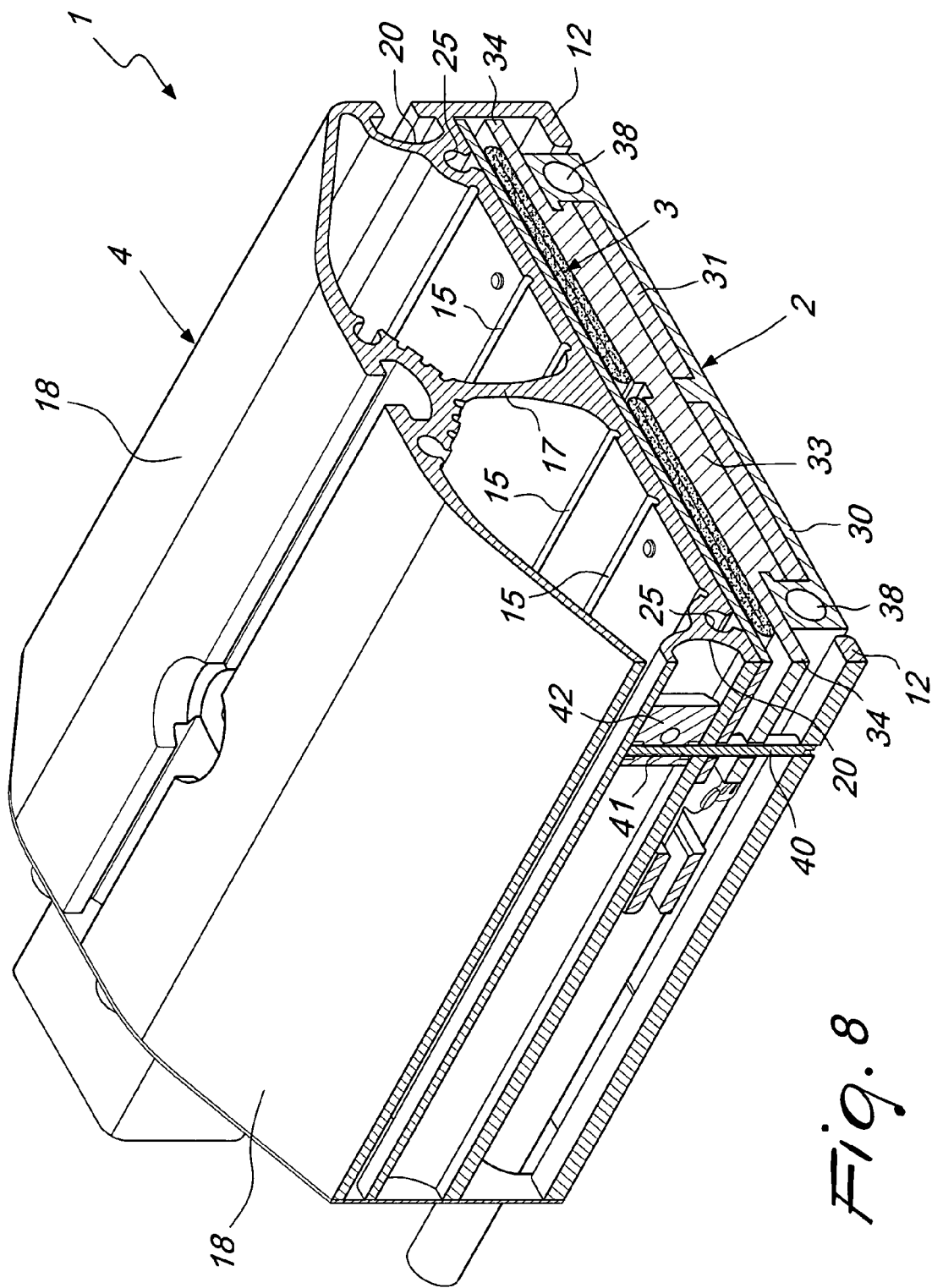
FIG. 8 is a perspective cutout view of the detail of the connection of the heating plate to the end of the reaction beam.
Figure 9:
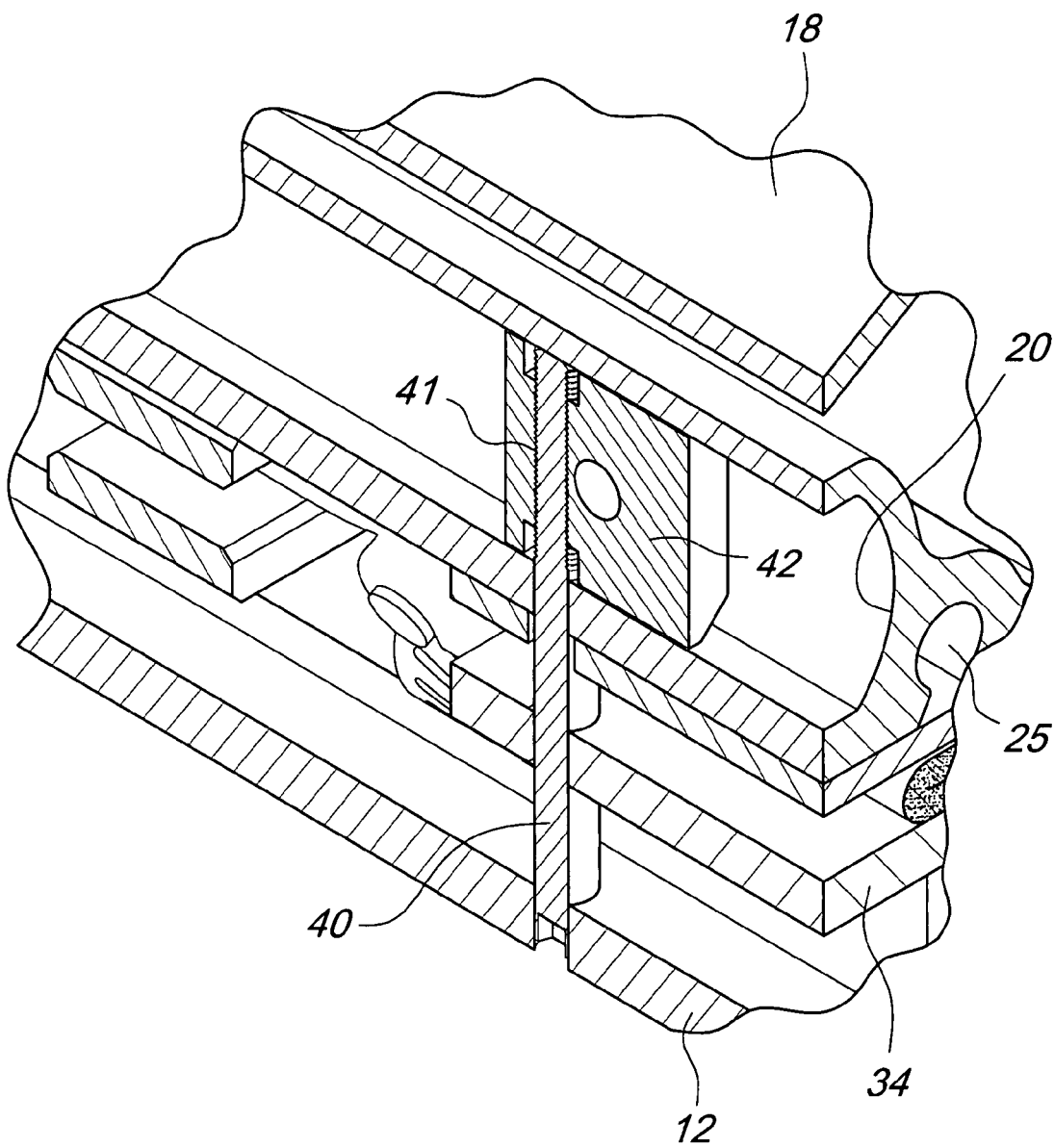
FIG. 9 is an enlarged-scale view of the fixing for connecting the heating plate to the reaction beam.

With reference to the figures, the joining press for joining the ends particularly of a conveyor belt and the like, generally designated by the reference numeral 1, comprises lower and upper heating plates, which are both designated by the reference numeral 2 and can be engaged by a pusher pad 3 of the pneumatic type which acts between the plate 2, as will become better apparent hereinafter, and the reaction beam, generally designated by the reference numeral 4.

A peculiarity of the invention consists in that the reaction beam 4 is provided so as to have a constant cross-section with an extruded element, preferably made of aluminum, which defines in a downward region a lower plate 11 on which the pad 3 acts; such lower plate is flanked by engagement wings 12, which allow coupling, as will become better apparent hereinafter, to the heating plate.

The extruded element which constitutes the reaction beam defines seats 15 which are arranged in mutually opposite pairs and are preset for the removable insertion and accommodation of reinforcement elements 16, which are constituted by laminas which remain locked between mutually opposite seats 15, so as to be able to vary the actual rigidity as a function of the size of the beam, without penalizing weight excessively.

As shown in the cross-sections, a central partition 17 is provided which protrudes from the lower plate 11 and blends, at the other end, with covering portions 18, which provide an outer seat 20 arranged on mutually opposite sides for connecting the locking elements 21 of the conveyor belt to be joined.

Moreover, at the lower plate 11 guides 25 are provided for connecting a membrane 26 which defines the pneumatic pusher pad in cooperation with the lower plate, this solution replacing the use of the classic pad 3 which acts between the lower plate 11 and the heating plate 2. In greater detail, the heating plate 2 has an outer face 30 which is substantially flat and is flanked by a heating resistor 31, positioned by means of a spacing insulator 32, which optionally can also be of the type which is directly integrated in the resistor.

The spacing insulator 32 is retained in position by means of an insulating body 33, which has a structural function for supporting the heating plate and is provided laterally with lips 34 which protrude with respect to the plate and are positioned so that said body 33 can be retained by the wings 12 defined by the extruded body which constitutes the reaction beam.

The assembly is further completed by a thermocouple 36, which adjusts the temperature, and ducts 38 for circulating cooling water are positioned on the longitudinal edges of the heating plate.

With this arrangement, the heating plate and the corresponding insulating body can be inserted without having to use screws.

Moreover, the longitudinal movement coupling between the reaction beam and the heating plate is provided by means of pins 40, one for each side, which enter the threaded seat 41 defined by a block 42 which can be accommodated within the outer seat 20 defined by the profiled element; the pin intersects the lips 34 of the insulating body 33, thus allowing to lock the relative longitudinal sliding between the reaction beam and the heating plate, leaving the possibility of free expansion of the heating plate when it is heated.

From what has been described above it can thus be seen that the invention achieves the proposed aim and objects, and in particular the fact is stressed that by providing the reaction beam by means of an extruded element provided with seats for detachable insertion of reinforcement elements, it is possible to have a single constructive element which in each instance is reinforced by introducing reinforcement elements 16 according to the different lengths, maintaining always the same shape with the consequent possibility to achieve very low weights for the assembly.

Another important aspect further consists in that the structure thus provided allows to simplify considerably the connection of the heating plate.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application No. MI2006A002377 from which this application claims priority are incorporated herein by reference.

What is claimed is:

1. A joining press for joining the ends particularly of a conveyor belt and the like, comprising:
   lower and upper heating plates;
   pusher pads engaged on said heating plates in order to apply a necessary pressure;
   reaction beams supporting said plates to contain a load applied by said pusher pads, said reaction beams comprising lower plate portions arranged for acting on said pusher pads, and said reaction beams comprising upper covering portions arranged distally from said lower plate portions;
   pairs of mutually arranged opposite seats each provided in said lower plate portions and said upper plate portions; and
   reinforcement lamina elements removable inserted and accommodated in said pairs of mutually arranged opposite seats and extending between said lower plate portions and said upper covering portions of said reaction beams whereby to vary a rigidity of said reaction beams.

2. The joining press according to claim 1, wherein said reaction beams have a substantially constant transverse cross-section.

3. The joining press according to claim 1, wherein said reaction beams are each provided by means of an extruded element.

4. The joining press according to claim 1, wherein said lower plate portions are each provided externally with engagement wings for coupling to the corresponding heating plate.

5. The joining press according to claim 1, wherein said reaction beams each have a central partition which protrudes from said lower plate portions and blends at an other end with said upper covering portions.

6. The joining press according to claim 5, wherein said reaction beams each have, on said covering portions, outer seats defined on mutually opposite sides.

7. The joining press according to claim 1, comprising at lateral edges of said lower plate portions, guides for connecting a membrane which defines a pneumatic pusher pad in cooperation with said lower plate portions.

8. The joining press according to claim 1, wherein said heating plates each have, in a downward region, a substantially flat outer face flanked by an insulating resistor, which is positioned by means of a spacing insulator, said spacing insulator being retained in position by an insulating body which is provided laterally with lips which protrude with respect to a respective one of said plates and can be coupled to said wings.

9. The joining press according to claim 1, comprising ducts for the cooling water on longitudinal edges of said heating plates.

10. The joining press according to claim 8, comprising means for constraining a longitudinal moment between said reaction beams and said heating plates, which are constituted by pins which can be inserted in a threaded seat defined by a block which can be accommodated within said outer seat, said pins intersecting the protruding lips of said insulating body connected to said heating plates.

* * * * *